(12) United States Patent
Senda

(10) Patent No.: US 8,965,451 B2
(45) Date of Patent: Feb. 24, 2015

(54) INFORMATION PROCESSING TERMINAL DEVICE

(75) Inventor: Keiichi Senda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 13/597,392

(22) Filed: Aug. 29, 2012

(65) Prior Publication Data

US 2013/0252667 A1 Sep. 26, 2013

(30) Foreign Application Priority Data

Mar. 22, 2012 (JP) ................................. 2012-066226

(51) Int. Cl.
*H04M 1/00* (2006.01)

(52) U.S. Cl.
USPC .................... 455/556.1; 455/90.3; 455/575.1; 345/158

(58) Field of Classification Search
USPC ......... 455/90.3, 550.1, 556.1, 575.1; 345/158
See application file for complete search history.

(56) References Cited

U.S. PATENT DOCUMENTS

| 8,244,068 | B2 | 8/2012 | Thörn |
| 2005/0128332 | A1 | 6/2005 | Tsuboi |
| 2006/0017871 | A1 | 1/2006 | Morimoto et al. |
| 2008/0151077 | A1* | 6/2008 | Hatano .......................... 348/239 |
| 2010/0123898 | A1* | 5/2010 | Akishiba ....................... 356/300 |
| 2010/0295756 | A1 | 11/2010 | Yoshida et al. |

FOREIGN PATENT DOCUMENTS

| CN | 1627811 A | 6/2005 |
| EP | 2 237 104 A1 | 10/2010 |
| JP | 2004-030187 A | 1/2004 |
| JP | 2005-039400 A | 2/2005 |
| JP | 2005-094386 A | 4/2005 |
| JP | 2006-30889 A | 2/2006 |
| JP | 2010-025995 A | 2/2010 |
| JP | 2010-97420 A | 4/2010 |
| JP | 2010-525425 A | 7/2010 |
| JP | 2010-191206 A | 9/2010 |
| KR | 10-2008-0000460 | 1/2008 |
| KR | 10-2012-0000210 | 1/2012 |
| KR | 10-2012-0021762 | 3/2012 |
| WO | WO 2004/098175 A1 | 11/2004 |
| WO | WO 2008/116503 A1 | 10/2008 |
| WO | WO 2009/096063 A1 | 8/2009 |

OTHER PUBLICATIONS

Office Action issued Jan. 16, 2014 in Korean Application No. 10-2012-0093603 (With English Translation).
Office Action issued on Jul. 8, 2014 in the corresponding Japanese patent Application No. 2012-066226 (with English Translation).
Office Action issued Jul. 31, 2014 in Chinese Patent Application No. 201210375457.1 (with English language translation).

* cited by examiner

*Primary Examiner* — Nhan Le

(74) *Attorney, Agent, or Firm* — Oblon, Spivak, McClelland, Maier & Neustadt, L.L.P.

(57) ABSTRACT

According to an embodiment, a smartphone having a display surface configured to display an image includes a liquid crystal panel, at least one CMOS image sensor, and a lens unit. The liquid crystal panel is a translucent display panel configured to display an image and allow light to pass through. The CMOS image sensor is arranged behind the liquid crystal panel and on a reflecting surface of a reflecting plate configured to reflect light toward the liquid crystal panel or at a position corresponding to a hole formed in the reflecting plate. The lens unit is arranged in front of an image capturing surface of the CMOS image sensor such that the CMOS image sensor can capture an image of a range corresponding to a display surface.

20 Claims, 7 Drawing Sheets

INFORMATION PROCESSING TERMINAL DEVICE

CROSS-REFERENCE TO RELATED APPLICATION

This application is based upon and claims the benefit of priority from the Japanese Patent Application No. 2012-66226 filed on Mar. 22, 2012; the entire contents of which are incorporated herein by reference.

FIELD

An embodiment described herein relates generally to an information processing terminal device.

BACKGROUND

Information processing terminal devices such as a cellular phone have been in widespread use. Information processing terminal devices include a cellular phone, a smartphone, a tablet PC (personal computer), and a PDA (personal digital assistant). Each of these devices has many functions.

For example, some recent cellular phones have an Internet access function, a camera function, and the like, in addition to common functions such as a phone call function and an e-mail function. An information processing terminal device includes a display section such as an LCD (liquid crystal display) and can display an image.

For example, a smartphone which is a sophisticated cellular phone would be more convenient if the smartphone had a scanner function. The process of translating a line sensor section across a surface of an object to be scanned that is adopted in a conventional portable scanner device, however, requires high-accuracy translation operation and is not user-friendly.

An LCD is proposed which has a scanner function in itself as an image display and includes an optical sensor for each pixel region. Although use of such a special LCD is also conceivable, the LCD is more expensive than a common LCD without a scanner function.

DETAILED DESCRIPTION

Figure 1:
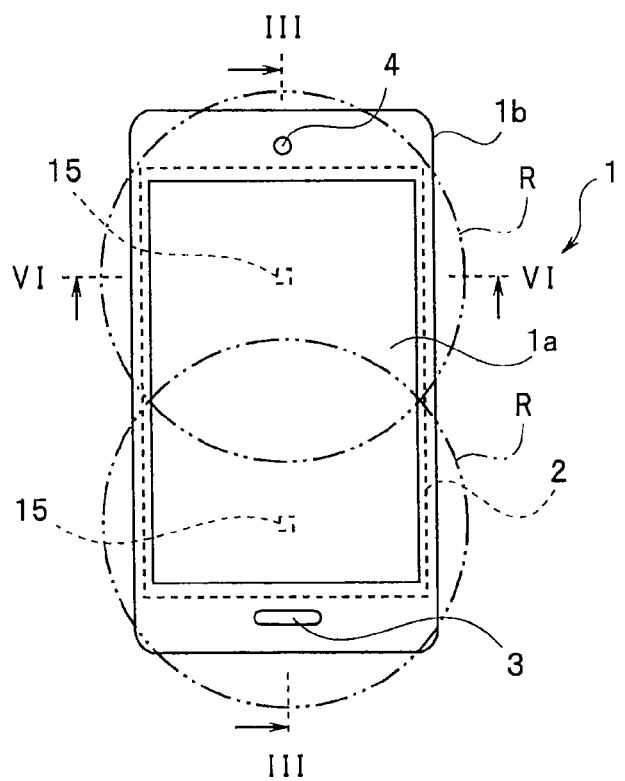
FIG. 1 is a front view of a smartphone according to an embodiment.

An information processing terminal device according to an embodiment having a display surface configured to display an image includes a display panel, at least one two-dimensional image sensor, and a lens unit. The display panel is a display panel configured to display the image and allow light to pass through. The at least one two-dimensional image sensor is arranged behind the display panel and on a reflecting surface of a reflecting member configured to reflect the light toward the display panel or at a position corresponding to a hole formed in the reflecting member. The lens unit is arranged in front of an image capturing surface of the at least one two-dimensional image sensor such that the at least one two-dimensional image sensor can capture an image in a direction toward the display surface.

The embodiment will be described below with reference to the drawings.

Note that respective components are shown with different scales in each of the drawings used in the description below such that the respective components are of sizes large enough to be recognized on the drawing. The present embodiment is not limited only to the quantity of components illustrated in the drawings, shapes of the components, size ratios among the components, and positional relationships among the components.

Figure 2:
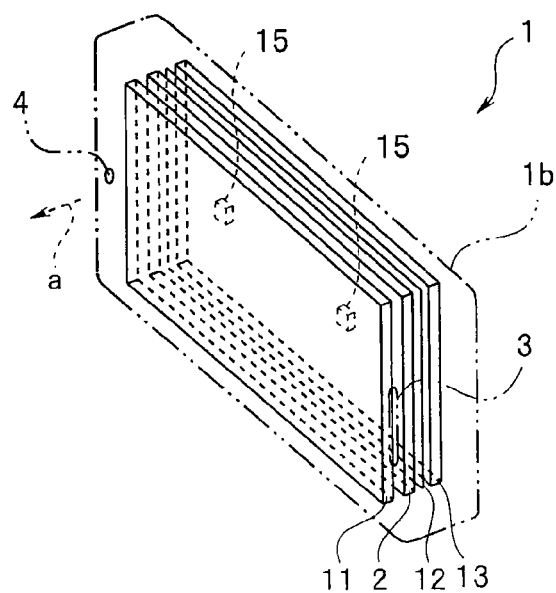
FIG. 2 is a schematic perspective view for explaining how a liquid crystal panel is arranged inside the smartphone according to the embodiment.
Figure 3:
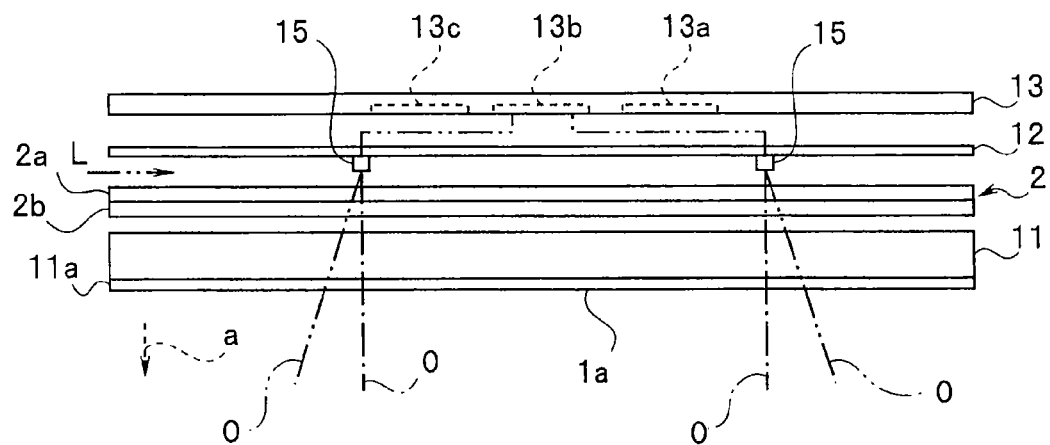
FIG. 3 is a schematic cross-sectional view taken along line III-III in FIG. 1 for explaining how a circuit board, a reflecting plate, the liquid crystal panel, and a glass substrate are arranged inside the smartphone according to the embodiment.

FIG. 1 is a front view of an information processing terminal device according to the present embodiment. A smartphone will be described as an example in the present embodiment. FIG. 2 is a schematic perspective view for explaining how a liquid crystal panel is arranged inside the smartphone. FIG. 3 is a schematic cross-sectional view taken along line III-III in FIG. 1 for explaining how a circuit board, a reflecting plate, the liquid crystal panel, and a glass substrate are arranged inside the smartphone.

As shown in FIG. 1, a smartphone 1 as an information processing terminal device is a smartphone incorporating a liquid crystal panel 2 which is a liquid crystal display (LCD). The liquid crystal panel 2 is provided inside the smartphone 1 such that a display surface of the liquid crystal panel 2 is located behind a display surface 1a of the smartphone 1. That is, the smartphone 1 as the information processing terminal device includes the display surface 1a configured to display an image.

Note that although a smartphone will be described here as an example of the information processing terminal device, the information processing terminal device may be a terminal device such as a so-called cellular phone, a tablet PC (personal computer), or a personal digital assistant (PDA).

The display surface 1a is a touch panel surface. A user can give various types of operating instructions to a control section (not shown) inside the smartphone 1 by touching the display surface 1a while viewing an image or video displayed on the display surface 1a. Note that the smartphone 1 includes, at a front, a microphone 3 for user conversation below the display surface 1a and a speaker 4 above the display surface 1a.

As shown in FIGS. 2 and 3, the liquid crystal panel 2 is arranged in an outer case 1b of a main body of the smartphone 1. A glass substrate 11 is arranged in front of the liquid crystal panel 2 on the side indicated by a dotted arrow a. A reflecting plate 12 and a circuit board 13 are arranged behind the liquid crystal panel 2.

A transparent conductive film 11a for a touch panel is provided on the obverse side of the glass substrate 11. An obverse surface of the conductive film 11a serves as the display surface 1a of the smartphone 1.

The liquid crystal panel 2 includes an array substrate 2a and a color filter substrate 2b and is a translucent display panel configured to display an image and allow light to pass through. A liquid crystal layer is formed between the array substrate 2a and the color filter substrate 2b. Sets of respective color filters of R, G, and B are arranged in a matrix at the color filter substrate 2b. That is, the liquid crystal panel 2 is a display panel including color filters of a plurality of colors.

The reflecting plate 12 is arranged behind the liquid crystal panel 2. An obverse surface of the reflecting plate 12 serves as a reflecting surface configured to reflect light. Backlight light L from a light source for backlight shown in FIG. 5 (to be described later) is introduced between the liquid crystal panel 2 and the reflecting plate 12. The reflecting plate 12 constitutes a reflecting member configured to reflect the backlight light L from the light source provided around the display surface 1a toward the liquid crystal panel 2. Accordingly, the backlight light L from the light source is reflected by the reflecting surface of the reflecting plate 12, passes through the liquid crystal panel 2, and is emitted from the display surface 1a. As a result, a user can view an image formed by liquid crystals of the liquid crystal panel 2.

Note that although the present embodiment uses the liquid crystal panel 2 as a display panel to be used in the smartphone 1, any other display panel such as an organic electroluminescent (EL) display panel configured to allow light to pass through may be used.

The circuit board 13 is arranged behind the reflecting plate 12. The circuit board 13 includes various types of circuits for implementing various types of functions of the smartphone 1, such as a central processing unit (hereinafter referred to as a CPU) 13a, an image processing section 13b, and a flash memory 13c which is a rewritable nonvolatile memory. Note that although not shown in FIG. 3, the circuit board 13 also includes memories such as a ROM and a RAM and various types of drive and control circuits configured to drive and control the liquid crystal panel 2, the light source, and the like.

Two image capturing devices 15 are mounted on a front surface, i.e., the reflecting surface of the reflecting plate 12. The image capturing devices 15 are arranged at positions corresponding to respective holes formed in the reflecting plate 12.

Note that although optical axes O (indicated by long dashed short dashed lines) of objective optical systems 15c (shown in FIG. 4 to be described later) of the image capturing devices 15 are orthogonal to the display surface 1a, as shown in FIG. 3, the optical axes O of objective optical systems 15c of the image capturing devices 15 may be tilted so as not to be orthogonal to the display surface 1a. For example, the two image capturing devices 15 may be mounted on the reflecting plate 12 such that the two optical axes O of the two image capturing devices 15 spread toward the display surface 1a, as indicated by long dashed double-short dashed lines in FIG. 3.

Figure 4:
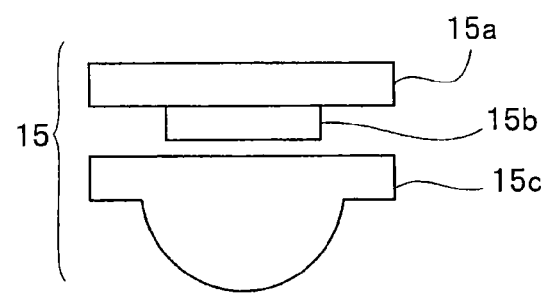
FIG. 4 is a configuration view showing a configuration of an image capturing device 15 according to the embodiment.

FIG. 4 is a configuration view showing a configuration of each image capturing device 15. The image capturing devices 15 each include a CMOS sensor 15b which is an image capturing element provided on a substrate 15a and the objective optical system 15c configured to direct light from a subject to an image capturing surface of the CMOS sensor 15b. The CMOS sensor 15b is a two-dimensional image sensor and monochrome image sensor. The CMOS sensor 15b here measures approximately 1 mm square. The objective optical system 15c is a lens unit with a wide-angle fisheye lens.

As shown in FIG. 1, two image capturing ranges R of the two image capturing devices 15 are set so as to overlap with each other and include a range corresponding to the display surface 1a.

As described above, the objective optical systems 15c are lens units which are arranged in front of the image capturing surfaces of the two CMOS sensors 15b such that the CMOS sensors 15b can capture an image of the range corresponding to the display surface 1a of the smartphone 1.

Figure 5:
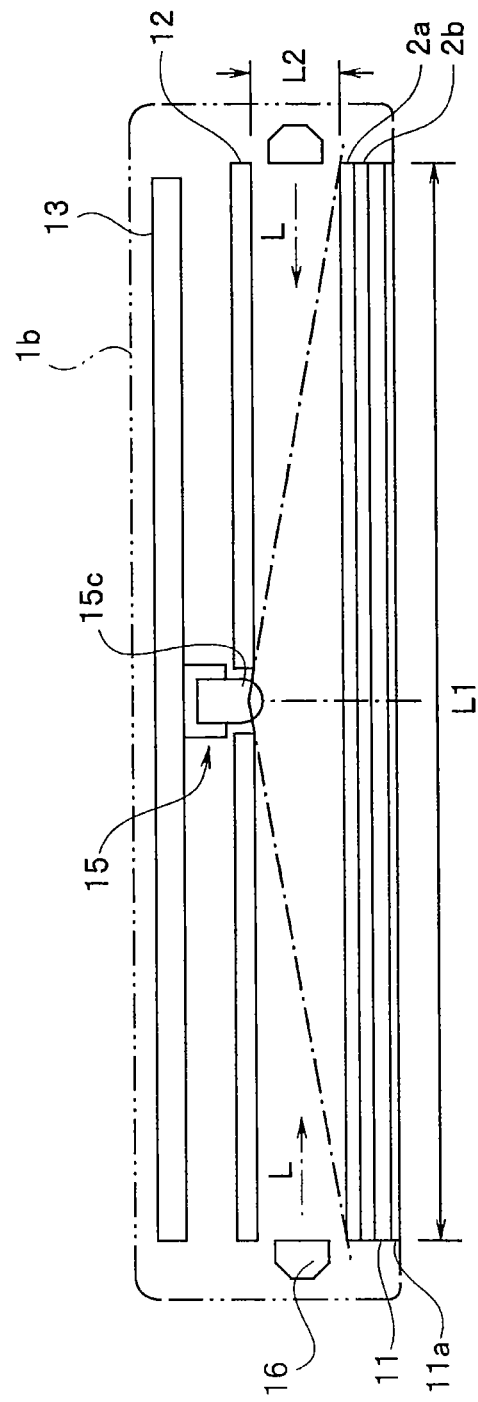
FIG. 5 is a schematic cross-sectional view taken along line VI-VI in FIG. 1 for explaining a relationship between an angle of view of the image capturing device 15 and color filters, according to the embodiment.

Note that the two image capturing devices 15 may be mounted on the circuit board 13 behind the reflecting plate 12 so as to protrude from the reflecting surface through the holes formed in the reflecting plate 12, as shown in FIG. 5 (to be described later), instead of being provided on the obverse surface of the reflecting plate 12. In this case, the image capturing devices 15 are arranged at the positions corresponding to the holes formed in the reflecting plate 12.

The image capturing devices 15 are driven by a driving signal from the image processing section 13b provided in the circuit board 13 and including a drive circuit and an image processing circuit. Image capturing signals obtained by the image capturing elements are output to the image processing section 13b. An image generated by the image processing section 13b is recorded in the flash memory 13c. That is, the image capturing devices 15 include at least one two-dimensional image sensor arranged behind the liquid crystal panel 2 and on the reflecting surface of the reflecting plate 12 that is a reflecting member configured to reflect light toward the liquid crystal panel 2 or at a position corresponding to a hole formed in the reflecting plate 12.

The objective optical systems 15c are each a fisheye lens and protrude forward from the reflecting surface of the reflecting plate 12. In order to prevent always-on pixels from appearing at positions corresponding to the objective optical systems 15c when the display surface 1a is viewed, the lenses are subjected to surface finishing so as to diffusely reflect light. For example, an obverse surface of each objective optical system 15c has asperities, like obscure glass.

FIG. 5 is a schematic cross-sectional view taken along line VI-VI in FIG. 1 for explaining a relationship between an angle of view of each image capturing device 15 and the color filter substrate 2b. A light source 16 for the backlight light L is disposed around the display surface 1a.

The image capturing devices 15 are mounted on the circuit board 13, and distal end portions of the objective optical systems 15c protrude forward (in a direction of the arrow a) from a plane of the reflecting surface of the reflecting plate 12.

For example, if a width L1 of the display surface 1a of the smartphone 1 is 7 cm, and a distance L2 from a center position of each objective optical system 15c to the liquid crystal panel 2 is 3 mm, the angle of view of each image capturing device 15 is 170°. The two image capturing devices 15 can photograph a region including the display surface 1a of the smartphone 1 through the liquid crystal panel 2.

The angle of view of each image capturing device 15 is not more than 180°. The angle of view of the image capturing device 15 may be about 160° depending on the width L1 of the display surface 1a of the information processing terminal device and the distance L2 from the center position of the objective optical system 15c to the liquid crystal panel 2. An angle of view of an image capturing device in a case where the information processing terminal device includes one image capturing device behind the liquid crystal panel 2 is different from angles of view of image capturing devices in a case where the information processing terminal device includes two or more image capturing devices.

If a plurality of image capturing devices 15 are arranged, and the width L1 is narrowed, photographing can be performed without a need for the image capturing devices 15 to have wide angles of view. Too many image capturing devices 15, however, affects image quality of the display panel. Accordingly, at least one image capturing device has an angle of view of not more than 180°, and the angle of view is preferably not less than 160° in the case of a cellular phone, a smartphone, or a tablet PC. In other words, at least one image capturing device 15 has an angle of view which allows at least one CMOS image sensor 15b to capture an image of the range corresponding to the display surface 1a.

Note that resolution of image capturing by each CMOS sensor 15b is preferably higher than resolution of display by the liquid crystal panel 2.

Since a monochrome image sensor is used as the CMOS sensor 15b of each image capturing device 15, and an image is captured using the color filters of the liquid crystal panel 2, the case has the advantage of being capable of displaying a captured image at a same resolution.

Figure 6:
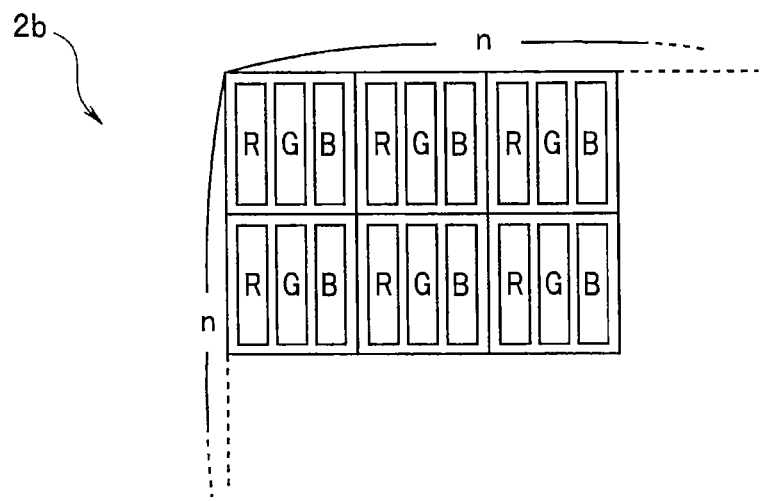
FIG. 6 is a view for explaining a configuration of color filters of a color filter substrate 2b according to the embodiment.

FIG. 6 is a view for explaining a configuration of the color filters of the color filter substrate 2b. As shown in FIG. 6, the plurality of color filters of R, G, and B are arranged in the matrix in order to display an image of m×n pixels. For example, m is 640, and n is 480.

A scanner function of the smartphone 1 will be described with reference to FIGS. 7 and 8. Note that the scanner function according to the present embodiment is a function of photographing a surface of an object but is called so in the sense of reading information on the surface of the object.

Figure 7:
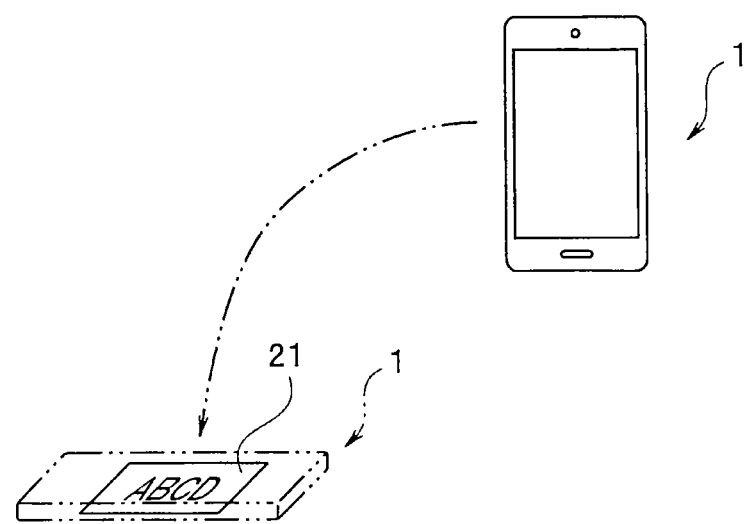
FIG. 7 is a view for explaining a case using a scanner function of a smartphone 1, according to the embodiment.

FIG. 7 is a view for explaining a case using the scanner function of the smartphone 1. After a user operates to give instructions to execute the scanner function to the smartphone 1, the user places the smartphone 1 on an object placed on a desk, an image of which is to be acquired, i.e., an object 21 to be photographed such that the display surface 1a of the smartphone 1 adheres tightly to the object 21 to be photographed, as shown in, e.g., FIG. 7. In FIG. 7, the object 21 to be photographed is a piece of paper of business card size which has the characters "ABCD." Although the object 21 to be photographed is scanned with the display surface 1a adhering tightly to, i.e., in contact with the object 21 to be photographed in this example, the display surface 1a need not be in contact with the object 21 to be photographed. The display surface 1a may be kept at a fixed distance from the object 21 to be photographed while the smartphone 1 is placed above the object 21 to be photographed.

Figure 8:
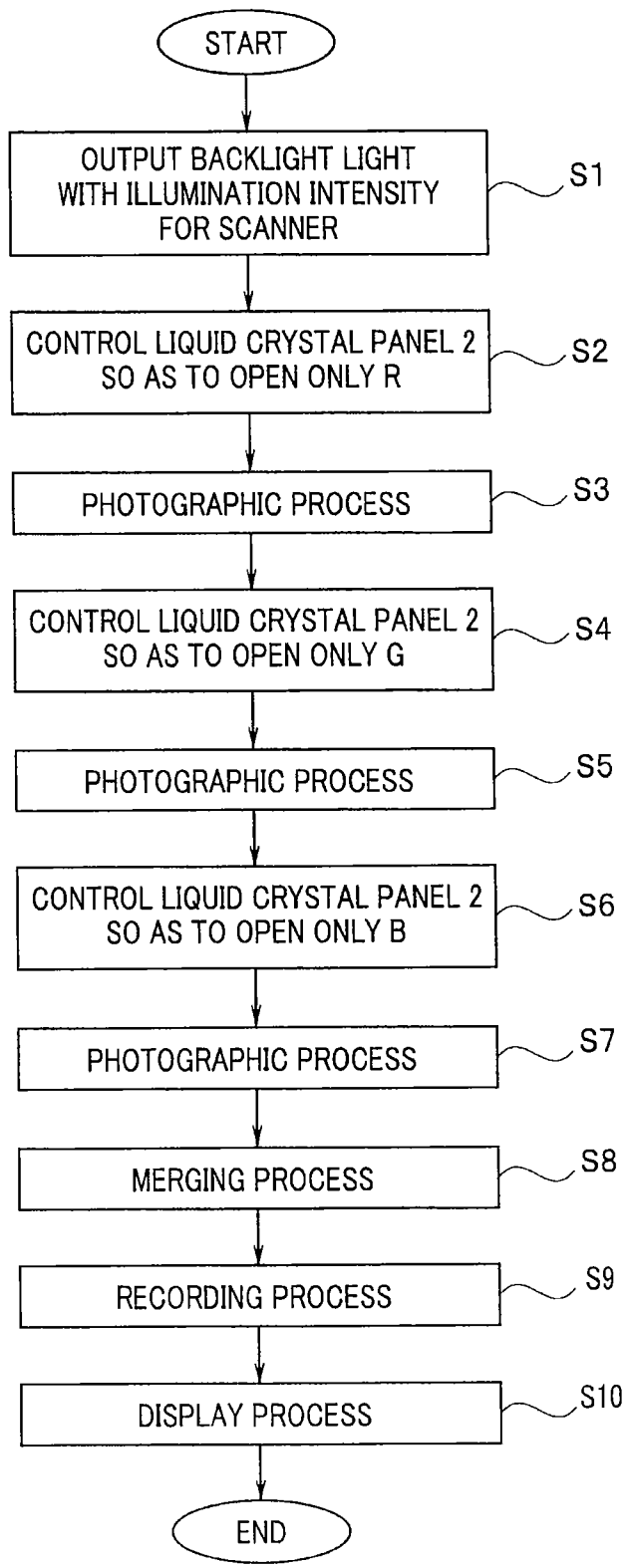
FIG. 8 is a flow chart showing an example of a flow of processing of the scanner function, according to the embodiment.

FIG. 8 is a flow chart showing an example of a flow of processing of the scanner function. When the CPU 13a of the smartphone 1 is instructed to execute the scanner function, the CPU 13a drives the light source 16 with power for the scanner function and outputs backlight light for a scanner, i.e., controls the light source 16 such that backlight illumination outputs backlight light with illumination intensity for the scanner (S1).

The CPU 13a controls the liquid crystal panel 2 so as to allow light to pass only through color filters of R (red) of the color filter substrate 2b of the liquid crystal panel 2, i.e., open only the color filters of R (red) (S2).

As a result, image light of R (red) color from a subject enters each CMOS sensor 15b, and the CPU 13a drives the CMOS sensor 15b to execute a photographic process (S3). An image obtained by the photographic process is output from the CMOS sensor 15b to the image processing section 13b.

The CPU 13a controls the liquid crystal panel 2 so as to allow light to pass only through color filters of G (green) of the color filter substrate 2b of the liquid crystal panel 2, i.e., open only the color filters of G (green) (S4).

As a result, image light of G (green) color from the subject enters the CMOS sensor 15b, and the CPU 13a drives the CMOS sensor 15b to execute a photographic process (S5).

The CPU 13a controls the liquid crystal panel 2 so as to allow light to pass only through color filters of B (blue) of the color filter substrate 2b of the liquid crystal panel 2, i.e., open only the color filters of B (blue) (S6).

As a result, image light of B (blue) color from the subject enters the CMOS sensor 15b, and the CPU 13a drives the CMOS sensor 15b to execute a photographic process (S7). As has been described above, the smartphone 1 performs image capturing with the CMOS sensors 15b while opening the color filters of the liquid crystal panel 2 color by color in a predetermined order so as to allow light to pass through.

The image processing section 13b executes a merging process on three images obtained by the three photographic operations (S8). Each image capturing device 5 includes the wide-angle objective optical system 15c, and two images obtained by the two image capturing devices 15 have overlapping ranges. In S8, the image processing section 13b executes a merging process of generating one image from the image portions having the overlapping ranges, in addition to image distortion correction.

Figure 9:
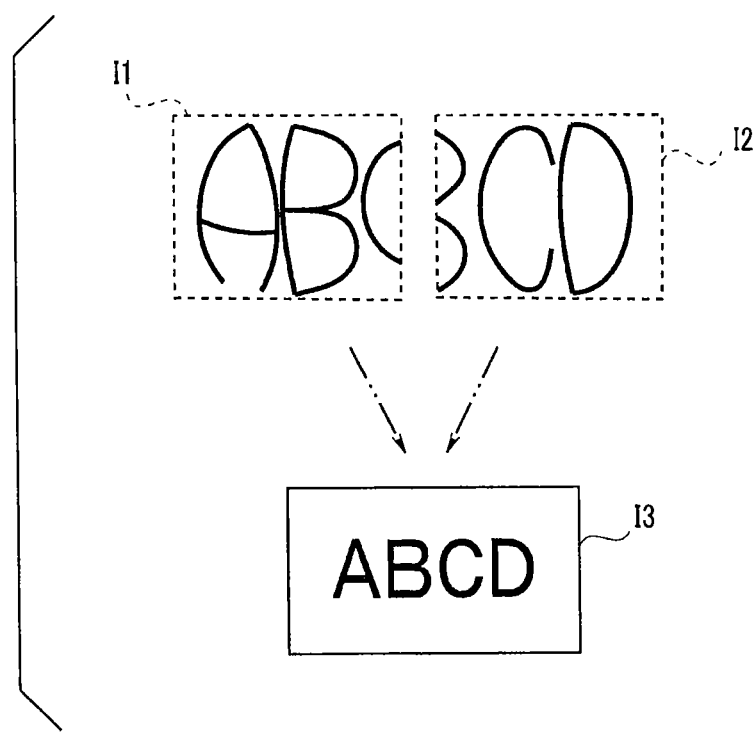
FIG. 9 is a view for explaining details of a merging process (S8) according to the embodiment.

FIG. 9 is a view for explaining details of the merging process (S8). As shown in FIG. 9, a composite image I3 without distortion is generated from two images I1 and I2 with distortion by the merging process (S8).

The CPU 13a executes a recording process of recording the composite image I3 generated by the image processing section 13b in the flash memory 13c (S9) and executes a display process of displaying an image to be scanned which is recorded in the flash memory 13c on the display surface 1a (S 10). As a result, the user can display the image photographed and recorded by the scanner function on the display surface 1a and view the image. As described above, the CPU 13a constitutes a control section configured to capture an image of the range corresponding to the display surface 1a for each of the colors of the color filters and merge the captured images of the respective colors.

Note that although a monochrome image sensor is used to perform the three photographic processes for R, G, and B of the color filters in the above example, a color image sensor may be used instead. For example, photographing may be performed once by using a color image sensor while all of the color filters are opened.

As has been described above, a user can photograph a surface of an object and incorporate an obtained image into the smartphone 1 simply by operating to give predetermined instructions to the smartphone 1 and placing the smartphone 1 such that the surface of the object faces the display surface 1a of the smartphone 1. Since a common display panel can be used as the liquid crystal panel 2, the smartphone 1 can be manufactured at low cost. As described above, an information processing terminal device which can easily perform photographing, does not require a user's photographing skills, and allows anyone to stably photograph an image can be provided.

Note that although the objective optical system 15c of each image capturing device 15 has a fixed focal length in the above example, the focal length may be variable.

Figure 10:
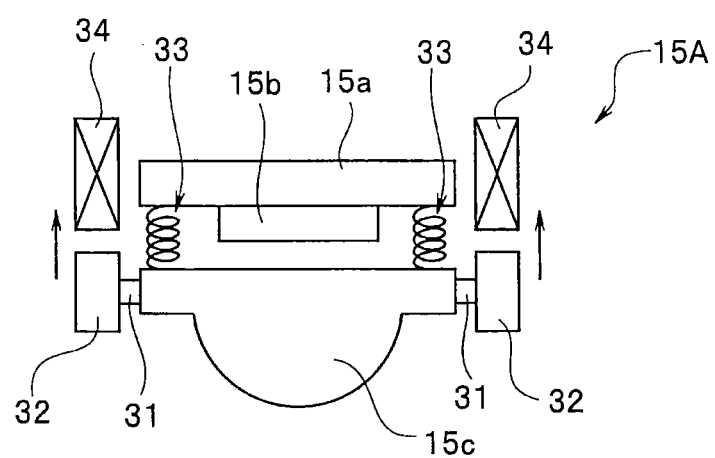
FIG. 10 is a view showing a configuration of an image capturing device 15A in which an objective optical system has a variable focal length, according to the embodiment.

FIG. 10 is a view showing a configuration of an image capturing device 15A in which an objective optical system has a variable focal length. Two support members 32 are provided to the objective optical system 15c through two shaft members 31. The support members 32 are each a metal member. The two support members 32 are members configured to support the objective optical system 15c inside the image capturing device 15A.

Each support member 32 is biased in a direction away from the substrate 15a by a coil spring 33 and is fixed at a predetermined position by butting against a member (not shown).

An electromagnet 34 is provided near each support member 32, and current flows through the electromagnet 34 in accordance with a control signal (not shown).

Accordingly, if control is performed such that a predetermined current flows through the electromagnets 34, the support members 32 are moved toward the electromagnets 34 to butt against the electromagnets 34. Along with the movement of the two support members 32, the objective optical system 15c moves to change the focal length of the image capturing device 15A.

If the smartphone 1 is configured in this manner, the smartphone 1 can change a position of an object to be photographed by the scanner function and thus can photograph an object with the display surface 1a at a distance from the object.

Additionally, since the two image capturing devices 15 are provided in the above example, image capturing for a so-called 3D image or so-called 3D video can be performed within depth of field of the objective optical systems 15c.

Moreover, although the number of image capturing devices 15 is two in the example, the number may be one or three or more.

As has been described above, the embodiment allows provision of an information processing terminal device which does not require conventional translation operation along a surface of an object for scanning and is structured to have a scanner function without an optical sensor provided in an image display itself.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. An information processing terminal device having a display surface configured to display an image, comprising:
   a display panel configured to display the image and allow light to pass through;
   at least one two-dimensional image sensor arranged behind the display panel and on a reflecting surface of a reflecting member configured to reflect the light toward the display panel or at a position corresponding to a hole formed in the reflecting member; and
   a lens unit arranged in front of an image capturing surface of the two-dimensional image sensor such that the two-dimensional image sensor can capture an image in a direction toward the display surface,
   wherein
   the two-dimensional image sensor is a monochrome image sensor, and the display panel includes color filters.

2. The information processing terminal device according to claim 1, wherein
   an angle of view of the lens unit is not less than 160° and not more than 180°.

3. The information processing terminal device according to claim 1, wherein
   the information processing terminal device performs image capturing with the two-dimensional image sensor while opening the color filters color by color in a predetermined order so as to allow light to pass through.

4. The information processing terminal device according to claim 1, wherein
   the lens unit has a variable focal length.

5. The information processing terminal device according to claim 1, wherein
   the information processing terminal device is one of a smartphone, a tablet personal computer, a cellular phone, and a personal digital assistant (PDA).

6. The information processing terminal device according to claim 1, wherein
   the display panel is a liquid crystal panel.

7. The information processing terminal device according to claim 6, wherein
   backlight is introduced between the liquid crystal panel and the reflecting member.

8. The information processing terminal device according to claim 7, further comprising
   a light source of the backlight disposed between the liquid crystal panel and the reflecting member around the information processing terminal device.

9. The information processing terminal device according to claim 1, wherein
   the display panel is an organic electroluminescent (EL) display panel.

10. The information processing terminal device according to claim 1, wherein
    the lens unit includes a fisheye lens.

11. An information processing terminal device having a display surface configured to display an image, comprising:
    a display panel configured to display the image and allow light to pass through;
    at least one two-dimensional image sensor arranged behind the display panel and on a reflecting surface of a reflecting member configured to reflect the light toward the display panel or at a position corresponding to a hole formed in the reflecting member; and
    a lens unit arranged in front of an image capturing surface of the two-dimensional image sensor such that the two-dimensional image sensor can capture an image in a direction toward the display surface,
    wherein
    the two-dimensional image sensor comprises a plurality of two-dimensional image sensors.

12. The information processing terminal device according to claim 11, wherein
    the information processing terminal device can capture 3D video with the plurality of two-dimensional image sensors.

13. The information processing terminal device according to claim 11, wherein
    the two-dimensional image sensor is a color image sensor, and the display panel includes color filters.

14. The information processing terminal device according to claim 13, wherein
    the color image sensor and the display panel share the color filters.

15. The information processing terminal device according to claim 13, wherein
the information processing terminal device performs image capturing with the at least one two-dimensional image sensor while opening all of the color filters.

16. The information processing terminal device according to claim 11, wherein
the lens unit includes a fisheye lens.

17. An information processing terminal device having a display surface configured to display an image, comprising:
a display panel configured to display the image and allow light to pass through;
at least one two-dimensional image sensor arranged behind the display panel and on a reflecting surface of a reflecting member configured to reflect the light toward the display panel or at a position corresponding to a hole formed in the reflecting member;
a lens unit arranged in front of an image capturing surface of the two-dimensional image sensor such that the two-dimensional image sensor can capture an image in a direction toward the display surface; and
a circuit board disposed behind the reflecting member, wherein
the circuit board performs signal processing on an image obtained by the two-dimensional image sensor.

18. The information processing terminal device according to claim 17, wherein
the circuit board includes a flash memory configured to store the image.

19. The information processing terminal device according to claim 17, wherein
the information processing terminal device is one of a smartphone, a tablet personal computer, a cellular phone, and a personal digital assistant (PDA).

20. The information processing terminal device according to claim 17, wherein
the lens unit includes a fisheye lens.

* * * * *